March 8, 1927.
W. E. JORY
1,620,356
AUTOMOBILE HEADLIGHT
Filed Feb. 24, 1926
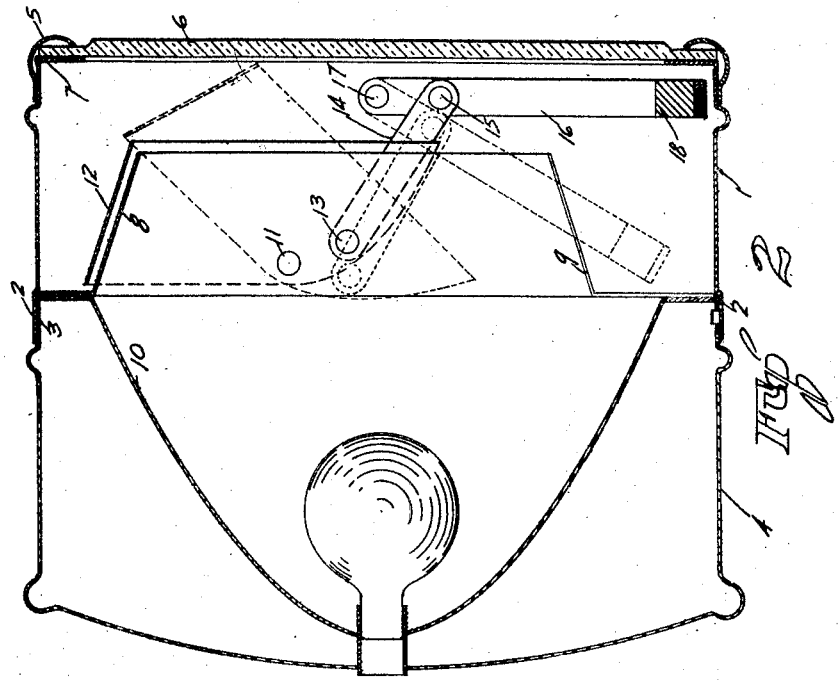
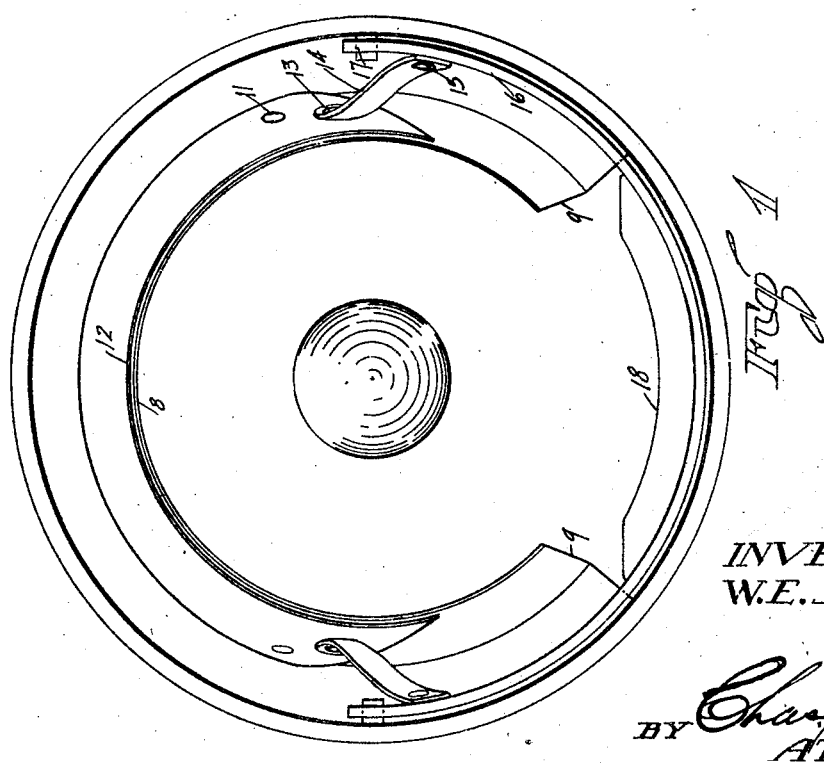
INVENTOR
W. E. JORY
BY Chas. J. Church
ATTY.

Patented Mar. 8, 1927.

1,620,356

UNITED STATES PATENT OFFICE.

WILLIAM E. JORY, OF MARTINEZ, CALIFORNIA.

AUTOMOBILE HEADLIGHT.

Application filed February 24, 1926. Serial No. 90,260.

This invention resides in the provision of a simply constructed, inexpensive, and readily attachable device for preventing the issuance of blinding and glaring light rays from automobile headlights, which device serves as a reliable and effective glare shield when the automobile is negotiating a hill or grade, or encounters a "bump" as well as when running on a level or comparatively level road.

An object of the invention is to provide a device of the character described in the form of an attachment which may be easily and quickly mounted on the present day style of headlight.

Another object of the invention is to provide an attachment as above described which will concentrate the light rays so as to provide for a better illumination of the road.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

Referring to the drawings:

Fig. 1 represents a front elevation of the attachment of my invention as when in use.

Fig. 2 represents a longitudinal vertical sectional view of the attachment and headlight.

The embodiment of the invention shown in the accompanying drawing comprises a cylindrical or substantially cylindrical shell 1, open at both ends and provided on one end with means 2 for detachably telescoping it on the front of the casing 3, of the ordinary automobile headlight 4. The bezel 5 and lens 6 of the headlight are removed to permit attachment of the shell 1 and said lens and bezel may then be mounted on the outer end of the shell in the same manner as the shell is mounted on the headlight casing 3. The shell is constructed as shown at 7 to provide for affixing the lens and bezel as above described. Thus the shell 1 serves as an extension of the headlight casing 3.

Suitably secured to the shell 1 interiorly thereof, is a frustro-conical opaque reflector and shield 8 which is cut away as at 9 on its lower side so that in front elevation it is of a substantial horse shoe shape. The inner and larger end of this shield 8 is contiguous with the forward edge of the reflector 10 of the headlight and as the shield is constricted towards its outer end it tends to concentrate the light rays so that they will be directed forward and downward from the headlight in a tapering beam. This shield cuts off certain of the light rays which are ordinarily thrown upward and laterally and produce a glaring and blinding effect. By cutting out the lower side of the shield the illumination of the roadway directly below and in front of the headlight is not interfered with but increased by the downward reflection from the upper part of the shield.

Pivoted as at 11 on the shield 8 is a visor-like opaque shield 12 of an inverted U-shape and which normally encompasses the upper half of the shield 8. Pivoted at certain ends as at 13 to the shield 12, are links 14 which at their other ends are pivoted as at 15 to a U-shaped pendulum 16. The pendulum is pivoted at its ends as at 17 to the shell 1 and has a weighted center portion 18.

When the automobile is running over a level road, the visor-like shield 12 is in non-shielding position shown in full line in Fig. 2, above the stationary shield 8. The position of the shield 8 is such as to prevent light rays from being directed upward and forward to the extent that the drivers of approaching vehicles will be confused or "blinded." This shield also acts as explained to concentrate the beam of light directed from the headlight. When a hill or grade is negotiated or a bump encountered the forward end of the automobile tilts upward and the pendulum 16 swings rearward. This pushes rearward the links 14 which links exert a force on the pivoted visor 12 and cause it to swing forward and downward in front of the shield 8 thereby shutting off the light rays which ordinarily would be directed upward and tend to "blind" or confuse approaching drivers. When the automobile reaches level ground the pendulum swings back and returns the shield to normal position. Thus, regardless of the grade or the bumps or rises encountered, the visor shield 17 will be automatically swung into proper position to shut off the blinding or glaring light rays. By making the inner side of the shield 12 a reflecting surface, the illumination of the roadway will be intensified by the downward reflections.

I claim:

The combination with an automobile headlight having a casing, a reflector and a source of illumination within the reflector, of a circular shell adapted for attachment to the front part and to serve as an extension of the casing, a lens carried by the shell, a shield in said shell the inner end of which shield is contiguous with the forward edge of the reflector, said shield being reduced towards its forward end to obstruct certain light rays directed from the reflector, a similarly shaped shield pivoted on the first named shield, a pendulum pivoted within the shell and arranged to swing rearwardly on tilting forward of the forward end of the headlight and a link pivotally connected with the pendulum and second named shield providing for the swinging of the shield forward and downward on rearward movement of the pendulum.

WILLIAM E. JORY.